INVENTOR.
RALPH E. BRUCE

BY

ATTORNEYS

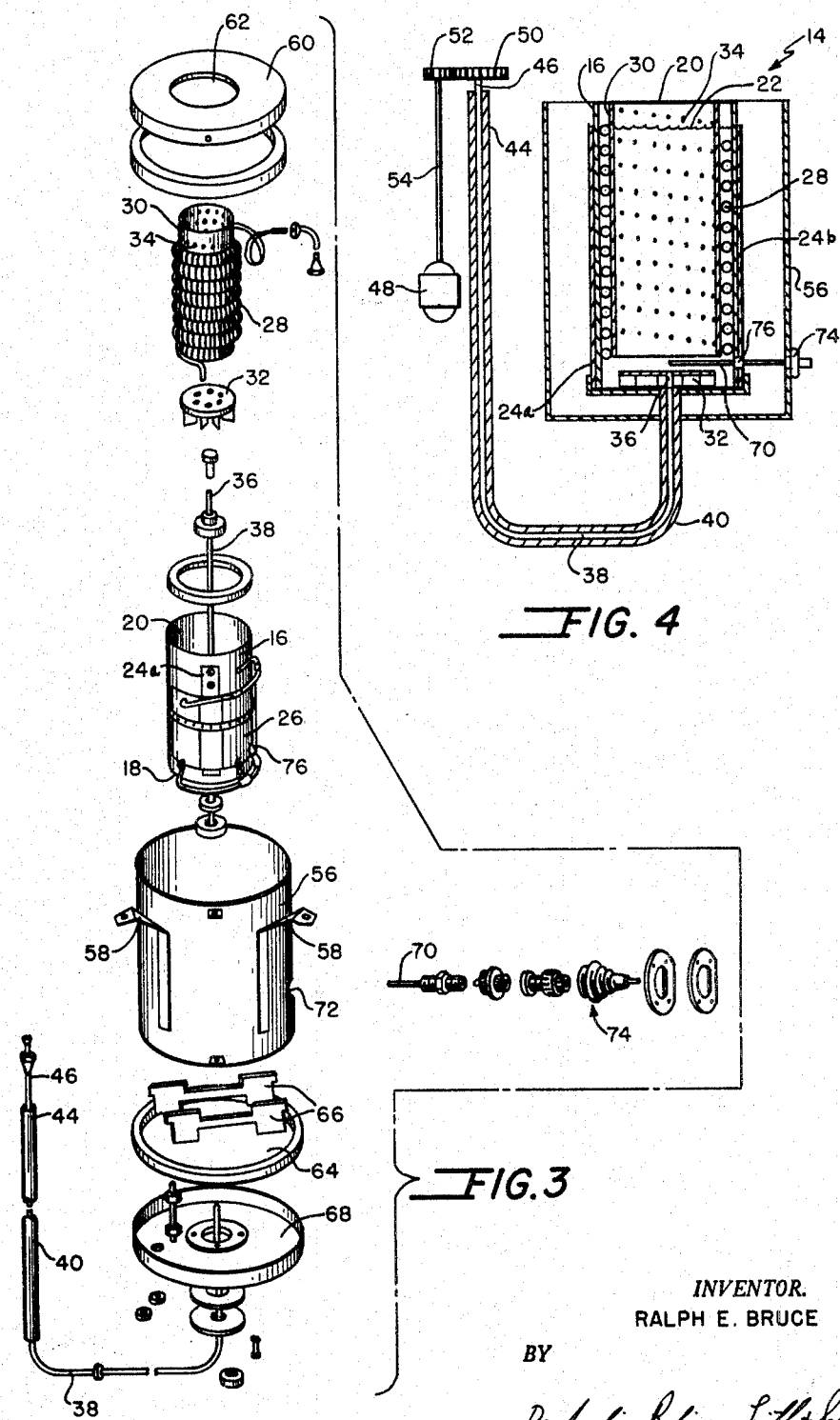

INVENTOR.
RALPH E. BRUCE

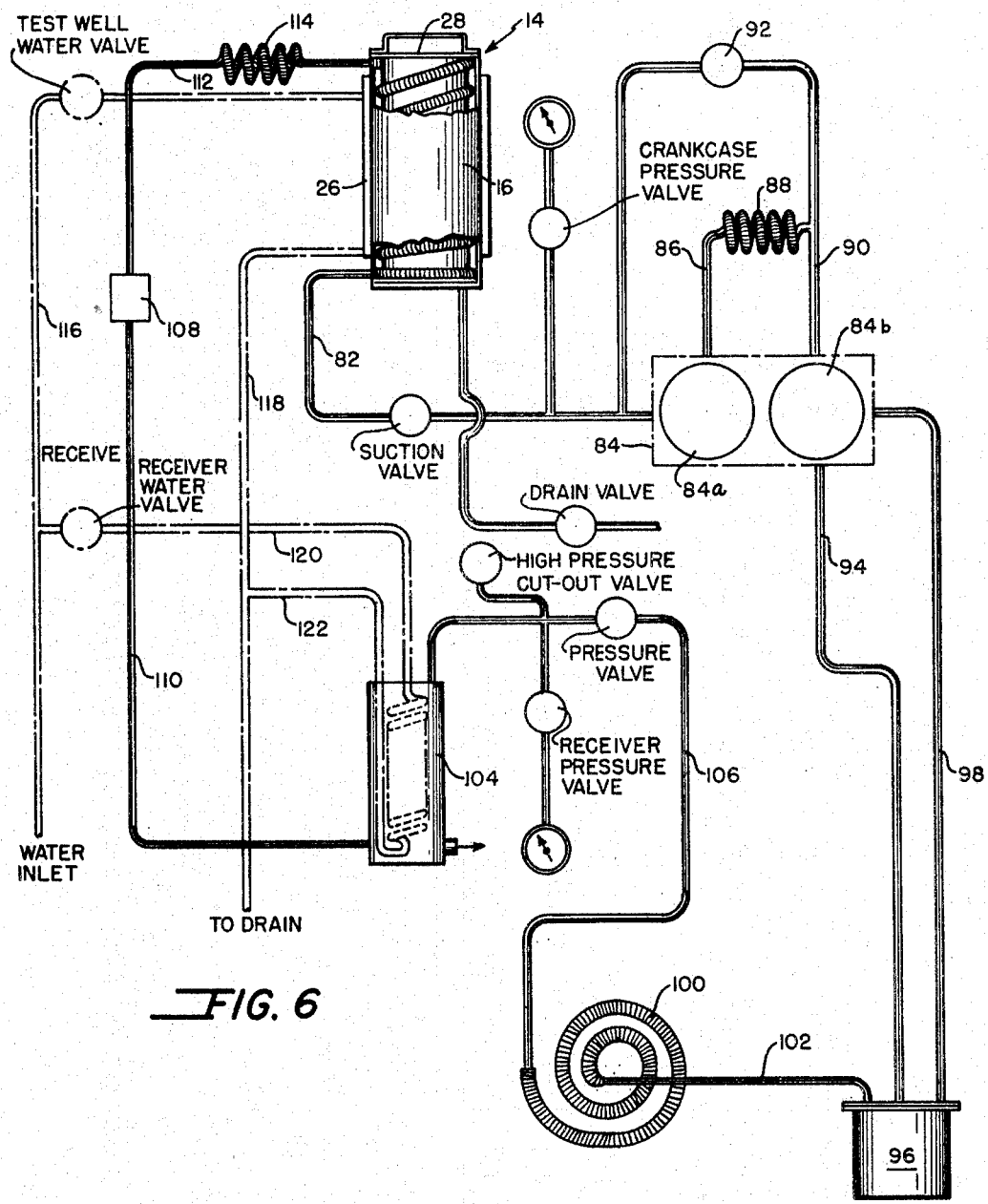

Aug. 2, 1966 R. E. BRUCE 3,263,740
APPARATUS FOR MAINTAINING A TESTING FLUID AT A
SELECTED TEMPERATURE
Filed Feb. 27, 1961 5 Sheets-Sheet 5
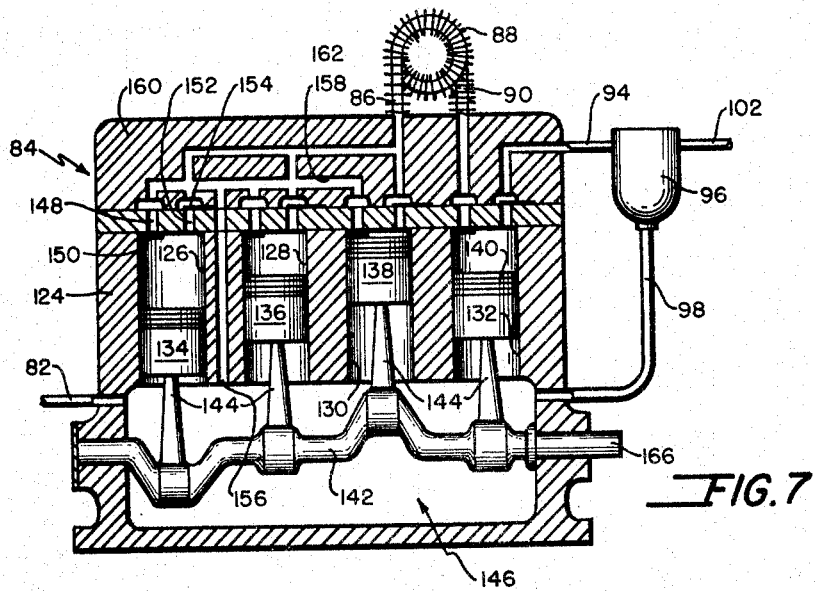
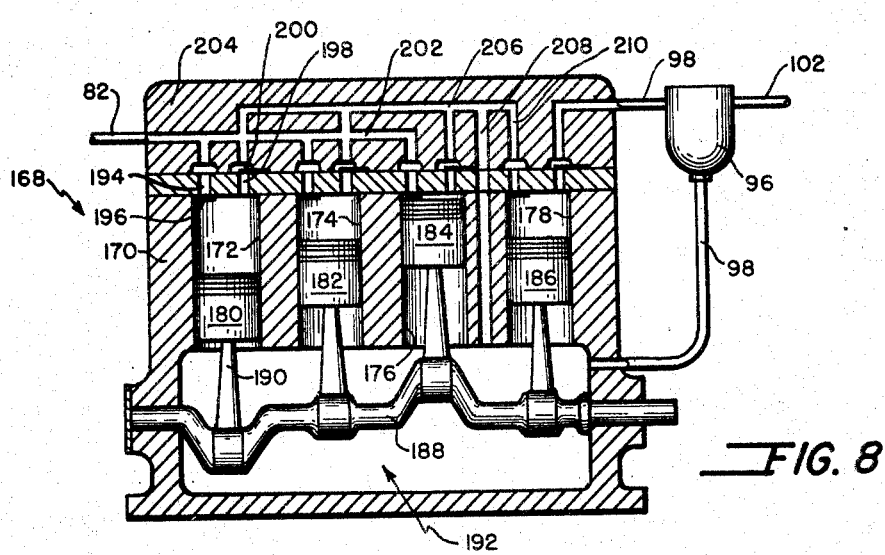
INVENTOR.
RALPH E. BRUCE
BY
*DesJardins, Robinson Little + Schuck*
ATTORNEYS

United States Patent Office 3,263,740
Patented August 2, 1966

3,263,740
APPARATUS FOR MAINTAINING A TESTING
FLUID AT A SELECTED TEMPERATURE
Ralph E. Bruce, 1032 Warwick Place, Dayton, Ohio
Filed Feb. 27, 1961, Ser. No. 91,985
7 Claims. (Cl. 165—26)

This invention relates to an improved apparatus for maintaining the temperature of a fluid at any desired temperature within a selected range of temperatures.

The subject apparatus is directed toward maintaining fluids, such as liquids or the like, at desired temperatures so that various instruments, such as aircraft instruments or the like, can be immersed in such fluids and thereby tested or calibrated at particular temperatures thereof to determine whether the instruments will operate accurately a various desired temperatures when utilized in the field.

For example, it may be desired to test a particular instrument at a relatively low temperature to see if the instrument will perform satisfactorily when utilized at that low temperature. Thereafter, it may be desired to test that same instrument at a relatively high temperature to see if it will also function properly when subject to high temperatures, such instrument normally being subject to such drastic temperature change when utilized in its intended environment, such as in an aircraft or the like.

Also, it may be desired to calibrate an instrument throughout a wide range of temperatures so that the instrument will indicate accurate readings thereof when subsequently utilized for intended purpose in the field where the instrument will be subject to various temperature changes.

Accordingly, apparatus is provided which has a test chamber filled with a fluid, such as liquid or the like, and has means for cooling or heating the fluid to tend to maintain the fluid at a desired temperature. Thus, when the fluid is maintained at a selected temperature, the instrument to be tested or calibrated can be immersed in such fluid whereby the fluid maintains the instrument at the selected temperature and the instrument can be tested or calibrated at that selected temperature. In this manner, the apparatus can simulate any atmospheric or other conditions to which the instrument will be subsequently subject to determine whether that instrument will perform satisfactorily under like conditions when utilized in the field.

The apparatus has a dial thereon which indicates the various degrees of temperature that the apparatus can maintain the testing fluid thereof. The operator of the apparatus merely adjusts a pointer connected with the dial to indicate a selected temperature and the apparatus will respond to such setting and tend to maintain the temperature of the testing fluid at that selected temperature.

It has been found that such apparatus should hold the testing fluid exactly at the selected temperature and not permit the temperature of the testing fluid to fluctuate a few degrees on either side of the selected temperature, thus enabling a true test or calibration of the instrument immersed in the testing fluid.

According to the teachings of this invention, an improved apparatus is provided wherein a testing fluid can be maintained at a selected temperature with only a relatively minute and negligible fluctuation in the temperature value of the testing fluid from the selected temperature, such as one-tenth of a degree on either side of the selected temperature.

One embodiment of this invention comprises a receptacle or test well containing a testing fluid that is adapted to have the temperature value thereof lowered or raised to the desired temperatures without freezing or boiling at the extreme ranges of temperature desired whereby an instrument or the like can be immersed in the test fluid and be calibrated or tested at a desired temperature ranging from say −55° centigrade to 120° centigrade.

Heater means are operatively interconnected with the receptacle and, when activated, heat the fluid contained therein. Cooling means are also operatively interconnected with the receptacle so that when the cooling means is operating the cooling means will lower the temperature of the testing fluid contained in the receptacle.

An agitator or stirring apparatus is disposed in the receptable and is adapted to cause continuous circulation of the fluid throughout the receptacle whereby the temperature of the fluid contained in the receptacle is maintained substantially uniform throughout the receptacle.

A sensing means is also disposed in the receptacle to continuously sense the temperature value of the testing fluid contained in the receptacle or testing well and is adapted to activate the heater means when the temperature of the testing fluid falls below a selected temperature value to cause the temperature of the fluid to rise back to the selected temperature value whereby the temperature of the fluid in the receptacle is maintained at that selected temperature value, the heater means being deactivated when the temperature value of the testing fluid is at or above the selected temperature.

The apparatus is so constructed and arranged that the operator thereof can select any temperature desired for the testing fluid in the receptacle ranging between the temperature limits of the apparatus, such as between −55° centigrade to 120° centigrade. However, it is to be understood that this invention is not to be limited to such temperature range as this is merely an example of one apparatus that has performed satisfactorily.

For example, should it be desired to have the temperature of the testing fluid maintained at a temperature above room temperature, such as 100° centigrade, the operator merely sets the indicator to that temperature whereby the sensing device senses that the temperature of the testing fluid is below 100° centigrade and activates the heater means to continuously heat the testing fluid. When the sensing means senses that the temperature of the testing fluid is now at or above the selected temperature, the sensing means deactivates the heater means whereby the surrounding atmosphere tends to lower the temperature of the testing fluid below 100° centigrade. When the temperature of the testing fluid falls one-tenth of a degree below 100° centigrade, the sensing means again activates the heater means to raise the temperature of the testing fluid.

However, it has been found that the sensing means will not turn off the heater means until after the testing fluid has been heated by the heater means at least one-half of a degree above 100° centigrade or the selected temperature, because the existing sensing means are not accurate within one-half of a degree.

Therefore, according to the teachings of this invention, means are provided for compensating for this error in the sensing means to prevent the temperature of the testing fluid from being heated by the heater means more than a fraction of a degree above the selected temperature, such as one-tenth of a degree.

In particular, an auxiliary heater is operatively connected with the sensing means to artificially heat the sensing means only when the main heater means are activated. Thus, when the heater means are activated by the sensing means to heat the testing fluid, the auxiliary heater heats the sensing means so that the sensing means detects a rise in temperature equal to the selected temperature plus one-half of a degree to turn off the main heater means when the main heater means has only raised the temperature of the testing fluid one-tenth of a degree above the selected temperature. In this manner, the auxiliary heater causes the sensing means to turn off the main heaters before the main heaters would heat up the testing fluid an amount sufficient to cause the inaccurate sensing means to turn off the main heaters.

Therefore, the auxiliary heater compensates for errors in the sensing means and thereby permits the temperature of the testing fluid to be maintained within one-tenth of a degree of the selected temperature.

While an example of one-tenth of a degree is illustrated above, it is to be understood that this invention is not to be limited to such a fraction because the auxiliary heater can be adjusted to operate faster or slower as desired.

When it is desired to have the temperature of the testing fluid maintained at a temperature below room temperature, such as 0° centigrade, the operator merely sets the indicator to that temperature whereby the cooling means of this invention is turned on and continuously runs to tend to lower the temperature of the testing fluid below the selected temperature. However, as the cooling means lowers the temperature of the testing fluid a tenth of a degree below the selected temperature, the sensing means turns on the main heater means to tend to raise the temperature of the testing fluid above the selected temperature. However, the auxiliary heater described above prevents the main heater means from heating the testing fluid more than one-tenth of a degree above the selected temperature whereby the cooling means and heater means continuously maintain the temperature of the testing fluid within one-tenth of a degree of the selected temperature.

Therefore, it can be seen that the apparatus of this invention provides accurate means for maintaining the temperature of a testing fluid at a selected temperature without having the temperature of the testing fluid fluctuate over a wide range on either side of the selected temperature.

Accordingly, it is an object of this invention to provide an improved apparatus for accurately maintaining the temperature of a test fluid or the like at a selected temperature.

A further object of this invention is to provide an improved compressor for operating the cooling means of such an apparatus or the like.

Another object of this invention is to provide an improved agitator for such an apparatus or the like.

Other objects, uses and advantages of this invention are apparent upon a reading of this description which proceeds with reference to the accompanying drawings forming a part thereof and wherein:

FIGURE 3 is an enlarged, exploded perspective view of the test well of the apparatus of FIGURE 1.

FIGURE 4 is a cross-sectional view of the assembled test well of FIGURE 3.

FIGURE 6 is a schematic diagram illustrating the cooling circuit of the apparatus of FIGURE 1.

FIGURE 7 is an axial, cross-sectional view illustrating one embodiment of the compressor of this invention.

FIGURE 8 is a view similar to FIGURE 7 and illustrates another embodiment of the compressor of this invention.

Figure 1:
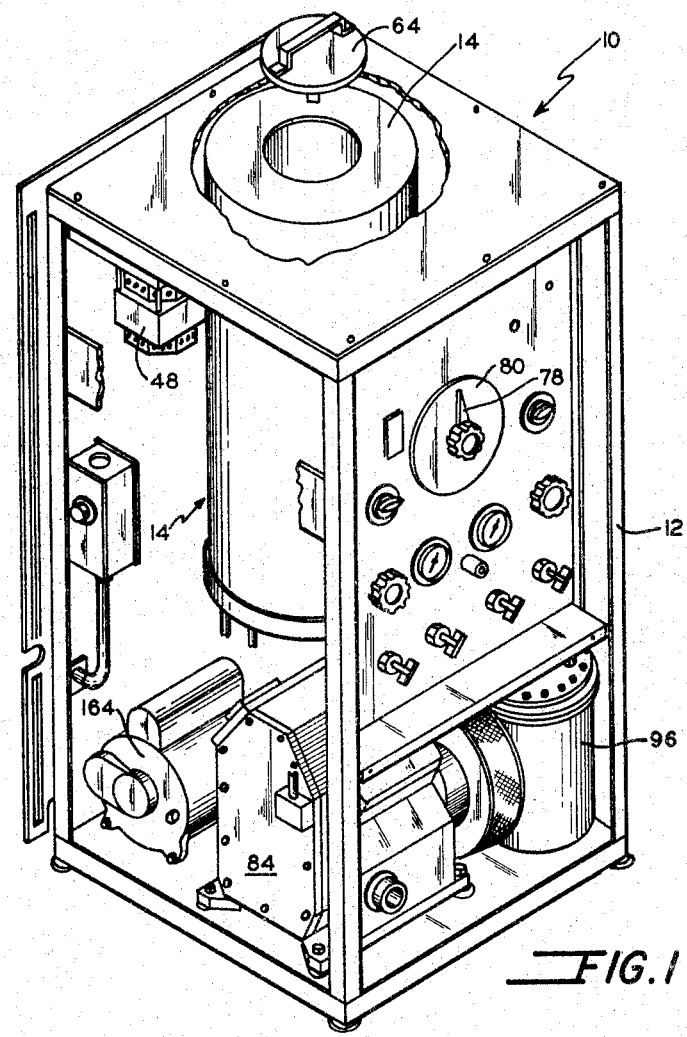
FIGURE 1 is an enlarged perspective view illustrating the apparatus of this invention with various panels thereof removed.
Figure 2:
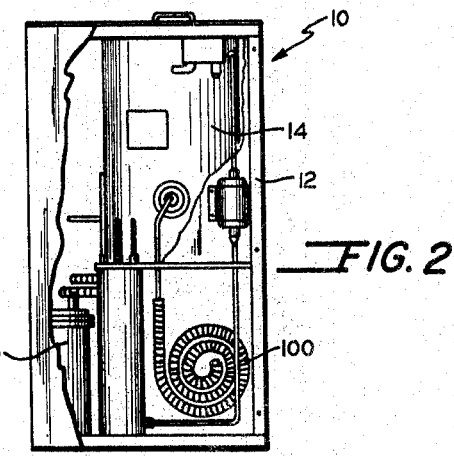
FIGURE 2 is a partially broken away end view of the apparatus illustrated in FIGURE 1 and illustrates certain parts thereof.

While this invention is hereinafter described as being particularly adaptable for providing testing apparatus for testing aircraft instruments and the like, it is to be understood that the various features of this invention can be utilized for other purposes as desired.

Therefore, this invention is not to be limited to only the application thereof as illustrated in the drawings, as the drawings are merely utilized to illustrate one of the embodiments of this invention.

Referring now to FIGURE 1, an improved apparatus of this invention is generally indicated by the reference numeral 10 and comprises a cabinet structure 12 carrying a test well 14 for receiving a testing fluid into which equipment can be immersed and thereby tested at a selected temperature of the testing fluid within the test well 14 in the manner set forth above.

As illustrated in FIGURES 3 and 4, the test well structure 14 comprises a cylindrical receptacle or shell 16 having a closed lower end 18 and an opened upper end 20, the receptacle 16 being adapted to contain a supply of a testing fluid 22, FIGURE 4, which is adapted to have the temperature thereof controlled in a manner hereinafter described.

While the liquid 22 can be of any desired type, it is preferred that the liquid 22 be of the type that does not have its viscosity increased when the temperature thereof is lowered to approximately −55° centigrade and does not boil or evaporate when the temperature thereof is raised to 120° centigrade. In this manner, regardless of the temperature of the liquid 22, the liquid 22 can be readily stirred or mixed in a manner hereinafter described to provide a uniform temperature thereof throughout the receptacle 16 so that when instruments are immersed therein to be tested at a particular temperature of the liquid 22, an accurate test of that instrument can be made.

One embodiment of the liquid 22 that has been found to perform satisfactorily is Thermalair No. 2, manufactured by the Laird Engineering Company, West Virginia. However, it is to be understood that this invention is not to be limited to any particular testing liquid 22 as long as the testing liquid 22 has substantially the same properties as set forth above.

The shell or receptacle 16 may be formed of copper or other good heat conducting materials and has a pair of electrical heaters 24a and 24b mounted to the external surface thereof which are adapted to heat the testing liquid 22 contained in the receptacle 16 in a manner hereinafter described. Also, suitable water jackets 26 are mounted to the external surface of the shell or receptacle 16 to prevent the heat from the heaters 24 from excessively heating the atmosphere surrounding the test well 14.

An evaporator coil 28 is disposed in the receptacle 16 closely adjacent the internal surface thereof and is adapted to circulate a refrigerant therethrough in order to cool the testing liquid 22 in the manner hereinafter described. A protective cylindrical shield 30 is disposed inside the evaporator coil 28 so as to protect the evaporator coil 28 from damage by objects being immersed into the testing liquid 22 to be tested therein.

The evaporator coil 28 and shield 30 are spaced upwardly from the closed end 18 of the receptacle 16 whereby an impeller or agitator 32 can be rotatably mounted at the bottom of the receptacle 16 and be rotated in a manner hereinafter described to continuously circulate the testing fluid 22 in the receptacle 16. For example, when the agitator or impeller 32 is rotated, the impeller 32 draws fluid from the external side of the protective shield 30 through suitable apertures 34 formed at the top thereof and downwardly through the center of the shield 30 to the impeller 32. The fluid drawn to the impeller 32 is thrown outwardly therefrom and upwardly over the evaporator coil 28 between the interior surface of the receptacle 16 and the exterior surface of the shield 30 to be recycled in the same manner. In this manner, when the impeller 32 is rotating, the testing fluid 22 is continuously cycled between the receptacle 16 and shield 30 so as to either receive heat from the heaters 24 or give up its heat to the refrigerant being circulated through the evaporator coil 28 in a manner well known in the art.

The impeller 32 is so constructed that the same completely recirculates the testing fluid 22 in the receptacle 16 once every few seconds whereby the fluid 22 is continuously being mixed so that a uniform temperature exists throughout the receptacle 16.

The impeller 32 is interconnected to one end 36 of a flexible drive shaft 38 and is rotated thereby when the drive shaft 38 is rotated. A flexible conduit 40 telescopically receives the flexible drive shaft 38 and has one end 42 thereof sealably secured in an opening formed in the bottom wall 18 of the receptacle 16.

The end 42 of the conduit 40 provides a fluid seal about the end 36 of the flexible drive shaft 38 whereby the liquid 22 in the receptacle 16 flows from the receptacle 16 into the area between the shaft 38 and the conduit 40 and not between the exterior surface of the conduit 40 and the bottom wall 18 of the receptacle 16. However, the drive shaft 38 and conduit 40 are so constructed and arranged, that the outer end 44 of the conduit 40 is disposed above the level of the liquid 22 contained in the receptacle 16 in the manner illustrated in FIGURE 4 whereby the liquid 22 contained between the shaft 38 and the conduit 40 is retained in the conduit 40 and cannot leak out of the end 44 thereof because the end 44 of the conduit 40 is disposed above the level of the liquid 22 in the receptacle 16.

The other end 46 of the flexible shaft 38 is operatively interconnected to motor means 48 that rotates the shaft 38 in the desired direction to thereby rotate the impeller or agitator 32 in the desired direction.

In particular, a gear 50 is carried on the end 46 of the flexible drive shaft 38 and is disposed in meshing relation with a gear 52 carried on the end of the shaft 54 of the motor 48 whereby the motor 38 can be disposed in any desired position relative to the test well 14 to drive the impeller 32.

By providing the conduit 40 and flexible drive shaft 38, it can be seen that no rotary seals are necessary to prevent leakage of the fluid from the receptacle 16 to provide drive means for the impeller 32 because the liquid contained between the shaft 38 and the conduit 40 is retained in the conduit 40 as the end 44 thereof is disposed above the level of the liquid 22 in the receptacle 16. Thus, even though the liquid 22 changes from −55° centigrade to about 120° centigrade in a matter of minutes in a manner hereinafter described, no special seals need be provided to withstand such temperature changes to prevent fluid leakage from the receptacle 16.

Further, the testing liquid 22 contained between the shaft 38 and the conduit 40 tends to lubricate the shaft 38 whereby the same can be readily rotated relative to the conduit 40 without supplying additional lubricating means.

The receptacle assembly 16 is disposed within an outer casing 56 having suitable heat insulating means on the interior surface thereof and being secured to the cabinet 12 by suitable brackets 58, FIGURE 3. The casing 56 has a suitable cover 60 provided with an opening 62 which is aligned with the interior of the shield 30 when the cover member 30 is assembled to the casing 56 in the manner illustrated in FIGURE 1. As illustrated in FIGURE 1, a suitable cover 64 can be provided for selectively opening and closing the opening 62 in the test well 14.

A bottom member 64 is detachably secured to the lower end of the casing 56 and carries suitable supports 66 for supporting the receptacle assembly 16 above the lower cover member 68 of the casing 56.

A temperature sensing bulb 70, FIGURES 3 and 4, is disposed in the receptacle 16 intermediate the impeller 32 and the lower end of the shield 30 to sense the temperature of the testing liquid 22 in a manner hereinafter described. The sensing bulb 70 passes through a suitable opening 72 in the casing 56 and is secured therein by suitable insulating means 74 which help support the bulb and prevent air from passing into the space between members 56 and 16. The bulb 70 passes through a suitable sleeve 76 provided in the side wall of the receptacle 16 and is sealably secured therein so that liquid cannot pass between the receptacle 16 and the casing 56.

Therefore, it can be seen that the apparatus of the invention so far described includes a receptacle 16 containing a suitable testing liquid 22 which is adapted to have the temperature thereof raised by the heaters 24a and 24b in a manner hereinafter described or have the temperature thereof lowered by the refrigerant circulated through the evaporator coil 28 in a manner hereinafter described, the temperature of the liquid 22 being sensed by the sensing device 70 in a manner hereinafter described.

When it is desired to raise the temperature of the testing liquid 22 above room temperature and maintain the testing liquid 22 at that raised temperature so that an instrument can be immersed in the testing liquid 22 and be tested or calibrated at that particular temperature, the heaters 24a and 24b are activated until the temperature of the testing liquid 22 reaches the selected temperature. When the liquid 22 reaches the selected temperature, the sensing device 70 deactivates the heaters 24a and 24b and continuously senses the temperature of the testing liquid 22 so that when the temperature of the testing liquid 22 falls slightly below the selected temperature by giving up its heat to the surrounding atmosphere, the heaters 24a and 24b will again be turned on a sufficient length of time to again raise the temperature of the testing liquid 22 to the selected temperature and then be deactivated by the sensing means 70 in a manner hereinafter described. Thus, the heaters 24a and 24b are continuously turned on and off to maintain the liquid 22 at the selected temperature.

When it is desired to maintain the testing liquid 22 at a temperature below room temperature, the refrigerant is continuously circulated through the evaporator coil 28 in a manner hereinafter described to continuously absorb heat from the testing liquid 22. When the temperature of the testing liquid 22 is lowered to the selected temperature, the sensing means 70 continuously senses the temperature of the testing liquid 22 so that should the temperature of the testing liquid 22 fall below the selected temperature, the sensing means 70 will activate the heaters 24a and 24b a sufficient length of time to raise the temperature of the testing liquid 22 back to the selected temperature, the heaters 24a and 24b being sufficient to overcome the cooling effect of the evaporator coil 28 during the heating cycle so as to raise the temperature of the testing liquid 22 the desired amount.

Thus, the evaporator coil 28 continuously cools the testing liquid 22, when the selected temperature is below room temperature, while the heaters 24a and 24b tend to maintain the testing liquid 22 at the selected temperature.

The apparatus 10 is so constructed and arranged in a manner hereinafter described that the operator thereof merely selects the desired temperature of the testing liquid 22 by moving a pointer 78, FIGURE 1, to the desired temperature reading indicated on a dial 80 whereby the apparatus 10 in the above manner raises or lowers the temperature of the testing liquid 22 of the selected temperature and thereafter maintains the same at that selected temperature.

The cooling circuit for the test well 14 will now be described and reference is made to FIGURE 6 which schematically illustrates the circuit diagram of the cooling system of this invention.

As illustrated in FIGURE 6, a conduit 82 leads from the evaporator coil 28 to the inlet side of a compressor 84, the compressor 84 being a two-stage compressor and being illustrated in detail in FIGURE 7.

The evaporated refrigerant compressed by the first stage 84a of the compressor 84 is delivered to a conduit 86 having a condenser coil 88 to tend to remove some of the heat from the compressed refrigerant. The refrigerant is delivered from the condenser coil 88 to the inlet side of the second stage 84b of the compressor 84 by a conduit 90, the conduit 90 also serving to by-pass the first stage 84a of the compressor 84 when a by-pass 92 is opened for a purpose hereinafter described.

The refrigerant compressed by the second stage 84b of the compressor 84 is delivered out through a conduit 94 leading to an oil separator 96 which separates the compressed refrigerant from the lubricating oil of the compressor 84 and delivers the lubricating oil back to the compressor 84 through a conduit means 98 while delivering the compressed refrigerant to a condenser coil 100 by a conduit means 102.

The compressed refrigerant is cooled in the condenser coil 100 by having air passing over the coil 100 and is delivered to a receiver 104 by a conduit means 106, the compressed refrigerant being stored in the receiver 104 and being delivered therefrom to a dryer 108 by a conduit means 110.

The dryer 108 is utilized to remove any moisture from the refrigerant circulated through the cooling system before the refrigerant is delivered to the evaporator coil 28 by a conduit means 112.

The conduit 112 has a capillary coil 114 therein which permits the compressed refrigerant delivered through the capillary 114 to evaporate upon entering the evaporator coil 28 and thereby absorb heat from the testing liquid 22 in the receptacle 16 as the evaporated refrigerant passes through the evaporator 28 on its way back to the compressor 84.

Because the capillary coil 114 provides a restriction to the flow of the refrigerant through the cooling system, the compressor 84 is adapted to create a suction or vacuum condition in the evaporator coil 28 whereby the liquid refrigerant metered through the capillary evaporates upon entering the vacuum created in the evaporated coil 28.

Water is delivered to the cooling jackets 26 of the test well 14 by an inlet conduit means 116 and is returned therefrom to drain by a conduit means 118. Water is also delivered to the receiver 104 by a branch conduit 120 and is returned therefrom to drain by a conduit 122.

The operation of the cooling system illustrated in FIGURE 6 will now be described.

When the compressor 84 is operating, the compressor 84 tends to draw the evaporated refrigerant from the evaporator coil 28 into the first stage 84a of the compressor 84. However, because the capillary 114 is disposed intermediate the evaporator coil 28 and the receiver 104, a suction is created in the evaporator coil 28 whereby any compressed refrigerant passing through the capillary 114 immediately enters a vacuum in the evaporator coil 28 and evaporates in the evaporator coil 28, the evaporated refrigerant absorbing heat from the testing liquid 22 in the test well 14 to lower the temperature thereof.

The evaporated refrigerant in the evaporator coil 28 is drawn into the first stage 84a of the compressor 84 and is compressed thereby. However, because relatively low temperatures are required by the apparatus 10, such as −55° centigrade, the capillary 114 and compressor 84 are so constructed and arranged that a suction of 25 inches of mercury is created in the evaporator coil 28 whereby the first stage 84a of the compressor 84 is only adapted to raise the pressure of the evaporated refrigerant a slight amount. Therefore, the compressed refrigerant delivered through the outlet conduit 86 of the compressor 84 is delivered to the second stage 84b of the compressor 84 to be further compressed thereby. Thereafter, the compressed refrigerant is delivered from the second stage 84b of the compressor 84 to the oil separator 96 through the conduit means 94.

Any lubricating oil of the compressor that is absorbed by the refrigerant as it passes through the compressor 84 is separated from the compressed refrigerant in the oil separator 96. At the temperature and pressure within the oil separator, the refrigerant exists as a gas and the oil exists as a liquid, therefore, the oil separator by providing a relatively large volume reduces the speed of the mixture of oil and refrigerant coming from the compressor to a speed which permits low turbulence. The low turbulence allows the oil which has a greater density than the refrigerant gas, to drop to the bottom of the separator whereby the oil in the lower portion of the oil separator 96 can be subsequently delivered back to the compressor 84 when a conventional float valve is opened in the oil separator 96 to deliver the oil back to the compressor 84 through the conduit means 98.

The compressed refrigerant in the oil separator 96 is delivered by the conduit means 102 into the condensing coil 100 whereby the heat of the compressed refrigerant is removed therefrom, air being passed over the condenser coil 100 by a suitable fan disposed in the apparatus 10 in a manner well known in the art to cool the refrigerant passing through the condenser coil 100. Thus, the compressed refrigerant in the condenser coil 100 is delivered to the receiver 104 by the conduit means 106 and is, thereafter, delivered to the evaporator coil 28 by the conduit means 110 and 112 after passing through the capillary coil 114 to permit the compressed refrigerant to be expanded and thereby evaporated in the evaporator coil 28 to repeat the cooling cycle thereof.

When the compressor 84 is initially turned on, the pressure of the refrigerant in the evaporator coil 28 is not as low as the pressure of the refrigerant in the evaporator coil 28 when the compressor 84 has been operating for some time. Therefore, it may not be necessary to use the first stage 84a of the compressor 84 to compress the refrigerant from the evaporator coil 28 a desired amount when the compressor 84 is initially operated. Thus, the first stage 84a of the compressor 84 can be bypassed by the operator of the apparatus 10 by opening the by-pass valve 92 whereby the second stage 84b of the compressor 84 initially takes the evaporated refrigerant from the evaporator coil 28 directly into the second stage 84b of the compressor 84 through the conduit means 90.

After the compressor 84 has been initially operating, the pressure of the refrigerant in the evaporator coil 28 is lowered, whereby it is necessary to utilize the first stage 84a of the compressor 84 in conjunction with the second stage 84b thereof. When this happens, the by-pass valve 92 is closed by the operator so that the first stage 84a of the compressor 84 will begin to operate in unison with the second stage 84b thereof in the manner previously described.

Therefore, any time that the compressor 84 is operating, the refrigerant passing through the evaporator coil 28 is attempting to remove heat from the testing liquid 22 in the test well 14 to lower the temperature value thereof.

The more specific details of the compressor 84 will now be described and reference is made to FIGURE 7, illustrating the compressor 84 in cross section.

As illustrated in FIGURE 7, the compressor 84 comprises a cylinder block 124 having a plurality of cylinders 126, 128, 130 and 132 formed therein and respectively receiving pistons 134, 136 and 138 and 140 in a conventional manner. Each piston 134, 136, 138 and 140 is respectively interconnected to a crankshaft 142 by a piston arm 144, the crankshaft 142 being disposed in a crankcase 146 in a manner conventional in the art.

While the compressor 84 is illustrated as having four cylinders in aligned relation, it is to be understood that the compressor could be a V-shaped compressor and could have any desired number of cylinders, as desired, the important feature being that the compressor 84 has more than one cylinder and provides two stages of compression in the following manner.

Each cylinder 126, 128, 130 and 132 has an inlet means 148 provided with a one-way valve means 150 and an outlet means 152 provided with a one-way valve means 154 in a manner conventional in the art.

The conduit means 82 leading from the evaporator coil 28 to the compressor 84 is interconnected with the crankcase 146 as illustrated in FIGURE 7, and the crankcase 146 is interconnected to the inlet means 148 of the cylinders 126, 128, and 130 by a passage means 156 interconnected to a common manifold 158 formed in the head 160 of the compressor 84, whereby the three cylinders 126, 128 and 130 of the first stage are connected in common with the crankcase.

In this manner, the evaporated refrigerant is drawn from the evaporator coil 28 into the crankcase 146 of the compressor 84 and thus into the inlet means 148 of the cylinders 126, 128 and 130. The refrigerant compressed in the cylinders 126, 128 and 130 is expelled out through the outlet means 152 thereof into a common manifold 162 which leads to the inner stage cooler 88 by the conduit means 86. The compressed refrigerant in the condenser coil 88 is then drawn into the inlet means 148 of the cylinder 132 and compressed therein. The refrigerant compressed in the cylinder 132 is delivered from the cylinder 132 out through the outlet means 152 into the conduit means 94 leading to the oil separator 96 whereby the oil is returned to the crankcase 146 by the conduit means 98 and the compressed refrigerant is delivered to the condenser coil 100 by the conduit means 102.

Therefore, it can be seen that the compressor 84 is a two-stage compressor whereby the cylinders 126, 128 and 130 thereof are utilized to initially compress the refrigerant received from the evaporator coil 28 and form the first stage 84a, while the cylinder 132 is utilized to further compress that refrigerant delivered from the cylinders 126, 128 and 130 and forms the second stage 84b of the compressor 84.

In this manner, a single compressor 84 can be utilized to produce a high vacuum in the evaporator coil 28 whereby the refrigerant can be utilized to bring the temperature of the testing fluid 22 in the testing well 14 down to a relatively low temperature and still compress the refrigerant enough to liquefy the same.

While the refrigerant does not act as a lubricant for the crankshaft 142, pistons 134, 136, 138 and 140, and piston rods 144, the oil absorbed therein is adapted to be returned to the crankcase 146 by permitting the refrigerant to circulate through the crankcase 146. If the refrigerant did not circulate through the crankcase 146, it would still absorb the lubricating oil from the cylinder walls of the cylinders 126, 128, 130 and 132 and would have to be separated out in the oil separator 96 in order to return the absorbed oil to the crankcase 146.

While any suitable refrigerant can be utilized, it is preferred to utilize Freon-12 because the same does not require excessive pressures to form the same back into a liquid after the Freon-12 has been evaporated in the evaporator coil 28. Further, by utilizing Freon-12, the compressor 84 is adapted to produce a suction of 25 inches of mercury in the evaporator coil 28 when the compressor 84 is operating.

Figure 5:
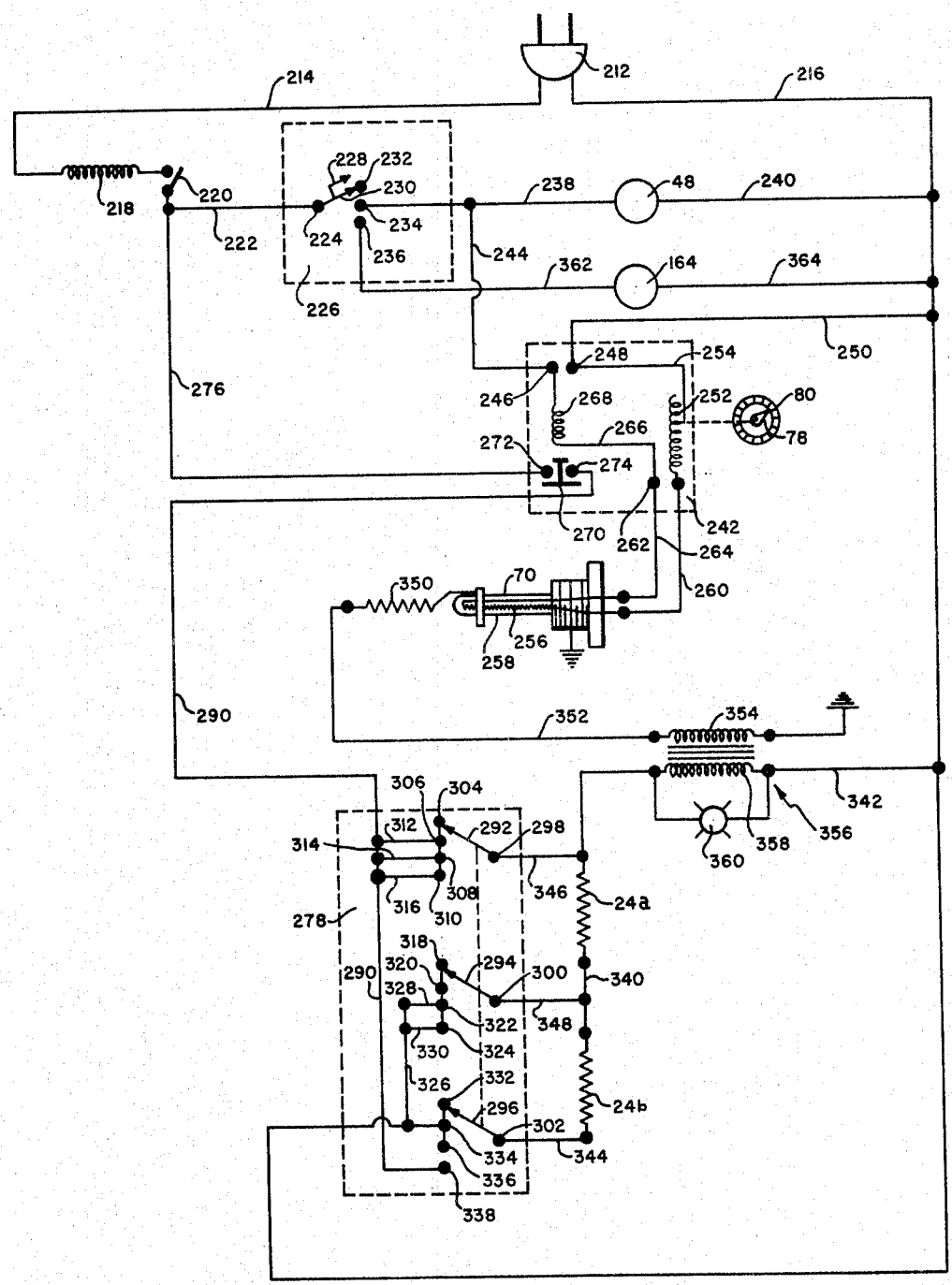
FIGURE 5 is a schematic diagram illustrating the electrical circuit of the apparatus of FIGURE 1.

The compressor 84 has the crankshaft 142 thereof interconnected to a suitable motor 164, FIGURES 1 and 5, by having the output shaft of the motor 164 operatively interconnected to the end 166 of the crankshaft 142 in a manner well known in the art.

Another two-stage compressor of this invention is illustrated in FIGURE 8 and is generally indicated by the reference numeral 168. The compressor 168 includes a cylinder block 170 having a plurality of cylinders 172, 174, 176 and 178 formed therein and respectively receiving pistons 180, 182, 184 and 186. The pistons 180, 182, 184 and 186 are interconnected to a crankshaft 188 by piston rods 190 in the same manner as the compressor 84 previously described, the crankshaft 188 being disposed in a crankcase 192 that is common to all of the cylinders 172, 174, 176 and 178.

Each cylinder 172, 174, 176 and 178 of the compressor 168 has an inlet means 194 provided with a one-way valve means 196 and an outlet means 198 provided with a one-way valve means 200 in a manner conventional in the art.

The conduit means 82 leading from the evaporator coil 28 is adapted to be interconnected to the inlet means 194 of the cylinders 172, 174 and 176 by a common manifold 202 formed in the cylinder head 204 of the compressor 168. The outlet means 198 of the cylinders 172, 174 and 176 are interconnected to a common manifold 206 formed in the cylinder head 204, the manifold means 206 being interconnected to the crankcase 192 by a passage means 208 and to the inlet means 194 of the second-stage cylinder 178 by a passage means 210.

In this manner, the evaporated refrigerant drawn from the evaporator coil 28 first enters the cylinders 172, 174 and 176 and is compressed therein before the same is directed to the crankcase 192. Thus, the crankcase 192 has a higher pressure that the pressure provided in the crankcase 146 of the compressor 84 previously described.

The refrigerant compressed in the cylinders 172, 174 and 176 comprising the first-stage means of the compressor 168 is then drawn into the cylinder 178 of the compressor 168 and is further compressed by the piston 186. The compressed refrigerant is directed out of the outlet means 198 of the cylinder 178 to the oil separator 96 in the manner previously described whereby the lubricating oil is returned to the crankcase 192 by the conduit means 98 and the compressed refrigerant is delivered to the condenser coil 100 by the conduit means 102.

Therefore, it can be seen that novel compressor means have been provided by this invention which permit a single compressor to operate in two stages. Only cylinder 178 has its inlet valve 196 connected directly to the crankcase. This enables the compressor to be started with less torque since the pressure accumulated in the crankcase during non-operative periods is presented to the suction valve of only one cylinder namely 178.

The apparatus for heating the testing fluid 22 in the test well 14 will now be described and reference is made to FIGURE 5, illustrating schematically the electrical circuit of this invention.

As illustrated in FIGURE 5, the heating means 24a and 24b of the test well 14 comprises a pair of electrical resistances 24a and 24b of any desired wattage. For example, each heater 24a and 24b can comprise a 500-watt heater.

The heaters 24a and 24b are interconnected to a source of electrical power (not shown) by a suitable plug 212 which has a pair of main power leads 214 and 216 extending therefrom.

The plug 212 is adapted to be plugged into any source of suitable electrical current, such as 115-volt, 60-cycle, alternating current. However, it is to be understood that other types of alternating current or even direct current may be utilized as coming within the scope of this invention.

A circuit breaker 218 is disposed in the lead 214 to open a switch 220 should a failure occur in the electrical circuit of this invention, the circuit breaker 218 merely being a safety device and being formed in any conventional manner.

A lead 222 is interconnected to the lead 214 through the circuit breaker 218 and is interconnected to a terminal 224 of a manually operated switch 226.

The switch 226 has a pair of movable contact arms 228 and 230 respectively interconnected to the terminal 224 thereof. The switch 226 has three terminal posts 232, 234 and 236, the post 232 not being electrically connected to anything, whereby, when the switch 226 is disposed in he position illustrated in FIGURE 5, the contact arm 230 is engaged with the terminal post 232 so that no current flows through the switch 226. When the contact arm 230 contacts the terminal 232, the sensing device 70 or heaters 24a and 24b cannot be energized, as will be apparent hereinafter.

The terminal 234 of the switch 226 is interconnected to one side of the agitator motor 48 by a lead 238, the other side of the agitator motor 48 being interconnected to the main power lead 216 by a lead 240.

In this manner, when the contact arm 230 of the switch 226 is manually moved so that the contact arm 230 makes contact with the terminal post 234, electrical current is supplied from the plug 212 to the agitator motor 48 whereby the agitator 32 will be operated in the above manner.

The agitator motor 48 is also energized when the contact arm 230 of the switch 226 is moved in contact with the terminal 236 of the switch 226, because the contact arm 228 bridges the connection between the terminal post 224 and 234 when the contact arm 230 is engaged with the terminal 236 of the switch 226.

When the contact arm 230 of the switch 226 makes contact with either the terminal 234 or 236, the sensing means 70 and heaters 24a and 24b of the apparatus 20 are adapted to be operated in the following manner, the sensing means 70 and heaters 24a and 24b being disconnected from the plug 212 when the contact arm 230 is disposed against the terminal 232.

A controller 242 is electrically interconnected to the lead 238 by a lead 244 being electrically connected to the lead 238 and to a terminal 246 of the controller 242.

The controller 242 is operatively interconnected to the sensing device 70 and the heaters 24a and 24b so that when the sensing device 70 senses that the temperature of the testing liquid 22 in the test well 14 falls below a selected temperature, the heaters 24a and 24b will be operated to heat the testing liquid 22 until the same raises the temperature of the testing liquid 22 a sufficient amount whereby the sensing device 70 terminates the electrical current being supplied to the heaters 24a and 24b in a manner hereinafter described.

The main power lead 216 is also interconnected to a terminal 248 of the controller 242 by a lead 250. The terminal 248 is interconnected to a variable resistor or potentiometer 252 by a lead 254, the potentiometer 252 being regulated by the pointer 78 on the apparatus 10. Thus, when the operator sets the pointer 78 to indicate a certain temperature on the dial 80, he is, in effect, adjusting the potentiometer 252 to add or subtract electrical resistance in the controller 242.

A small resistance wire 256 is electrically insulated from and disposed in a metallic shell or bulb 258 and comprises the sensing device 70, one side of the resistance 256 being interconnected in series to the potentiometer 252 by a lead 260. The other side of the resistance wire 256 is interconnected to a terminal 262 of the controller 242 by a lead 264. The terminal 262 of the controller 242 is interconnected to the terminal 246 thereof by a lead 266 having an energizing coil 268 disposed therein and operatively interconnected to a normally opened relay 270 for a purpose hereinafter described.

Therefore, it can be seen that the potentiometer 252 and resistance wire 256 of the sensing device 70 are disposed in series, across the leads 214 and 216 when the switch 226 interconnects the terminal 224 thereof with the terminal 234 thereof by either of the contact arms 228 or 230.

The coil 268 of the relay 270 is so constructed and arranged that the same will not cause the relay 270 to close against contacts 272 and 274 when the total resistance value of the potentiometer 252 and resistance wire 256 is above a certain resistance value. However, should the total resistance value of the potentiometer 252 and resistance 256 fall below that particular resistance value, sufficient current is supplied to the coil 268 of the relay 270 to cause the relay 270 to close against the contacts 272 and 274 to operate the heaters 24a and 24b in a manner hereinafter described.

It is well known that the resistance value of a resistance increases when heated and decreases as the heat is taken away therefrom. Accordingly, when the potentiometer 252 is adjusted by the pointer 78 to indicate a temperature value of say 100° centigrade, as long as the testing fluid 22 in the test well 14 is at a 100° centigrade or above, the combined resistance value of the potentiometer 252 and resistance 256 is of a sufficient value to prevent the coil 268 of the relay 270 from being energized. However, should the temperature value of the testing fluid 22 in the test well 14 fall below the 100° centigrade, the resistance value of the resistance wire 256 will also fall below the resistance value it would have if it was at 100° centigrade. Thus, the lowered resistance value of the resistance 256 together with resistance value of the potentiometer 252 is sufficient to permit the coil 268 of the relay 270 to be energized whereby the relay 270 is closed, causing the heaters 24a and 24b to be energized to heat the testing fluid 22 in the test well 14. As the testing fluid 22 in test well 14 is heated, the temperature value of the resistance 256 of the sensing device 70 is also raised, whereby when the resistance value of the resistance 256 is increased an amount so that the total resistance value of the resistance 256 and potentiometer 252 causes the coil 268 of the relay 270 to be de-energized, the relay 270 disconnects the electrical current from the heaters 24a and 24b because the sensing means 70 has determined that the temperature value of the testing fluid 22 is now at 100° centigrade and does not require further heating.

The terminal 272 of the relay 270 is interconnected to the main power lead 214 by a lead 276. The terminal 274 of the relay 270 is interconnected to a gang switch 278 by a lead 290.

The switch 278 includes a plurality of movable contact arms 292, 294 and 296 manually operated in unison and respectively connected at one of the ends thereof to terminals 298, 300 and 302 of the switch 278.

The contact arm 292 of the switch 278 is movable between four terminals, 304, 306, 308 and 310 of the switch 278, the terminal 304 not being electrically connected to anything, while the terminals 306, 308 and 310 are respectively connected to the lead 290 by leads 312, 314 and 316.

The contact arm 294 of the switch 278 is movable to respectively engage four terminals 318, 320, 322 and 324 of the switch 278, the terminals 318 and 320 not being electrically connected to anything, while the terminals 322 and 324 are electrically connected to a lead 326 by leads 328 and 330.

The lead 326 of the switch 278 is interconnected to the main power lead 216, as illustrated in FIGURE 5.

The contact arm 296 of the switch 278 is adapted to be movable to engage four terminals 332, 334, 336 and 338 of the switch 278, the terminals 332 and 336 not being electrically connected to anything, while the terminal 334 is electrically connected to the main power lead 216 and the terminal 338 is electrically connected to the lead 290 of the switch 278.

The resistances or heaters 24a and 24b have adjacent ends thereof interconnected together by a lead 340, while one end of the resistance 24a is interconnected to the main power lead 216 by a lead 342 through a suitable transformer and light hereafter described and the other end of the resistance 24b is interconnected to the terminal 302 of the switch 278 by a lead 344. The lead 342 is interconnected to the terminal 298 of the switch 278 by a lead 346 and the lead 340 is disposed between the resistances 24a and 24b is interconnected to the terminal 300 of the switch 278 by a lead 348.

The operation of the switch 278 will now be described.

It is assumed that the lead 290 is supplied electrical current from the lead 214 by having the relay 270 of the controller 242 closed. However, as long as the contact arms 292, 294 and 296 of the switch 278 are disposed in the position illustrated in FIGURE 5, no current is supplied to the heaters 24a and 24b.

When the contact arms 292, 294 and 296 make contact respectively with the terminals 306, 320 and 334, the resistances 24a and 24b are disposed in series across the main power leads 214 and 216 whereby the total wattage supplied by the heaters 24a and 24b, when the same are 500-watt heaters, is approximately 250 watts.

The apparatus 10 is normally operated with the switch 278 disposed in a position whereby the heaters 24a and 24b only supply 250 watts of heat, because once a certain temperature of the testing fluid 22 in the test well 14 is attained, it requires relatively little heat to maintain the same at that temperature, as will be apparent hereinafter.

However, when the contact arms 292, 294 and 296 of the switch 298 are respectively disposed in contact with the terminals 308, 322 and 336, only the heater 24a is supplied electrical current whereby the heater 24a develops 500 wats.

When the contact arms 292, 294 and 296 of the switch 278 are disposed in contact with the contacts 310, 324 and 338, the heaters 24a and 24b are disposed in parallel across the main power leads 214 and 216, whereby each heater supplies 500 watts of heat for a total wattage of 1,000.

When the heaters 24a and 24b are utilized to supply either 500 watts or 1,000 watts of heat, in the above manner, such wattage is only utilized to rapidly run the temperature of the testing fluid 22 in the test well 14 up to the desired temperature, and, thereafter, the switch 278 is disposed in the position to only provide 250 watts of heat.

Thus, when the operator of the apparatus 10 wants to maintain the liquid 22 in the test well 14 at a temperature above room temperature, he adjusts the indicator 78 of the apparatus 10 to the desired temperature setting on the dial 80 thereof. Subsequently, he moves the contact arm 230 of the switch 226 so as to make contact with the terminal 234 thereof and moves the contact arms 292, 294 and 296 of the switch 278 so that the same make contact with the contacts 306, 320 and 334.

If the sensing device 70 senses that the temperature value of the testing liquid 22 in the test well 14 is below the selected temperature, the sensing device 70 permits the coil 268 of the relay 270 to be energized whereby heat is supplied by the heaters 24a and 24b in the above manner to heat the liquid 22 in the test well 14.

When the sensing device 70 senses that the temperature of the testing liquid 22 in the test well 14 is now raised to the selected temperature, the coil 268 of the relay 270 is de-energized, whereby the relay 270 opens and terminates the electrical current being supplied to the heaters 24a and 24b. Thereafter, should the temperature of the testing liquid 22 in the test well 14 fall below the selected temperature, the sensing device 70 senses such change in temperature and again causes the relay 270 to close and turn on the heaters 24a and 24b in the above manner. Therefore, the sensing device 70 continuously turns on and off the heaters 24a and 24b to tend to maintain the temperature of the liquid 22 in the test well 14 at the selected temperature.

However, it has been found that the controller 242 is only accurate within say half a degree centigrade, whereby the temperature of the liquid 22 in the test well 14 can fluctuate between half a degree on either side of the selected temperature. Thus, if it is desired that the liquid 22 in the test well 14 be maintained at 100° centigrade, the sensing device 70 will not turn off the heaters 24a and 24b until the temperature of the testing liquid 22 in the test well 14 reaches 100½° centigrade.

In order to compensate for this error in the controller 242, an anticipating circuit is provided and comprises a small resistance 350 located around the shell 258 of the sensing device 70. The resistance 350 has one side thereof interconnected to ground by passing through the metal shell 258. In fact, the resistance 350 can comprise the metal shell 258 of the sensing means 70, if desired, or can comprise a separate resistance. The other side of the resistance 350 is interconnected to a lead 352 connected to ground through a transformer 356 having a secondary winding 354. The primary winding 358 of the transformer 356 is disposed in the lead 342 so that when one or both of the heaters 24a and 24b are operating, current is supplied by the transformer 356 to the heater 350, which artifically heats the sensing device 70 independent of the temperature of the testing liquid 22 in the test well 14 to cause the temperature of the resistance 256 of the sensing device 70 to be raised at the same time that the heaters 24a and 24b are operating.

Thus, in the afore-mentioned example where the apparatus 10 is set to maintain the temperature of the liquid 22 in the test well 14 at 100° centigrade, and the sensing device 70 has determined that the heaters 24a and 24b are to be turned on, the relay 270 closes in the aforementioned manner to cause the heater 24a to be energized to heat the liquid 22 in the test well 14. However, while the heaters 24a and 24b are energized and heating the liquid 22, the transformer 356 is operating and causing the heater 350 to artifically heat the resistance 256 of the sensing device 70 independently of the temperature of the liquid 22 in the test well 14. Thus, the heater 350 causes the sensing device 70 to sence a half-degree change in temperature above the selected temperature before the testing liquid 22 in the test well 14 has its temperature increased a half a degree above the selected temperature by the heaters 24a and 24b. In this manner, the sensing device 70 de-energizes the coil 268 of the relay 70 to cause the heaters 24a and 24b to be turned off before the temperature of the testing liquid 22 in the test well 14 has raised half a degree above the selected temperature value, as would be required if the heater 350 were not provided. If the temperature of the liquid 22 in the test well 14 has not been raised to a 100° centigrade by the time the sensing device 70 turns off the heaters 24a and 24b, the heaters 24a and 24b are again turned on to heat the liquid 22 while the heater 350 is operating to raise the temperature of the resistance 256 a half a degree above the selected temperature, as previously described. Thus, the sensing device 70 keeps operating the heaters 24a and 24b until the temperature of the liquid 22 in the test well 14 is raised to the selected temperature. Because the auxiliary heater 350 prevents the heaters 24a and 24b from raising the temperature of the liquid 22 a half a degree above the selected temperature, the temperature of the liquid 22 in the test well 14 is maintained substantially at the selected temperature by the sensing means 70.

For example, the heaters 24a and 24b may be turned on long enough by the sensing means 70 to only raise the temperature of the liquid 22 in the test well one-tenth of a degree above the selected temperature during the same length of time it takes the auxiliary heater 350 to cause the sensing device 70 to turn off the heaters 24a and 24b, because the resistance 256 is heated by the heater 350 to a temperature equal to more than half a degree above the selected temperature during that time.

Therefore, the auxiliary heater 350 compensates for the error existing in the sensing means 70 whereby the sensing means 70 only permits the heaters 24a and 24b to raise the temperature of the testing liquid 22 in the nature of one-tenth of a degree above the selected temperature value thereof.

An indicating light 360 is disposed across the transformer 356 whereby the light 360 only comes on when current is being supplied to the heaters 24a and 24b and is turned off when the heaters 24a and 24b are not operating.

After the operator has selected the desired temperature by the pointer 78, whether above room temperature or below, he can determine when the temperature of the liquid 22 is at that temperature by looking at the indicating light 360. When the light 360 rapidly flicks on and off, this is an indication that the heaters 24a and 24b are maintaining the temperature of the testing liquid 22 in the test well 14 at the selected temperature.

The motor 164 that operates the compressor 84 or the compressor 168 has one side thereof electrically connected to the terminal 236 of the switch 226 by a lead 362. The other side of the motor 164 is interconnected to the main power lead 216 by a lead 364.

In this manner, when it is desired to maintain the testing liquid 22 in the test well 14 below room temperature, the switch 226 is moved to the position whereby the contact 230 spans the terminals 224 and 236 while the contact arm 228 thereof spans the terminals 224 and 234. When the switch 226 is in this position, the agitator motor 48 is continuously operated and the compressor motor 164 is continuously operated.

As long as the temperature value of the liquid 22 in the test well 14 remains above the selected temperature, the sensing device 70 prevents the heaters 24a and 24b from being turned on, and the compressor 84 or 168 causes the evaporator coil 28 to continuously remove heat from the testing liquid 22.

Thus, the compressor 84 or 168 continues to operate causing the refrigerant to pass through the evaporator coil 28 to tend to lower the temperature value of the liquid 22 in the test well 14 below a selected temperature.

When the evaporator coil 28 causes the temperature value of the liquid 22 in the test well 14 to be lowered below the selected temperature value, the sensing device 70 senses that the temperature is below the selected temperature value and causes the relay 270 to close, whereby the heaters 24a and 24b are turned on in the above manner and tend to heat up the liquid 22 in the test well 14 above the selected temperature value thereof. However, because the auxiliary heater 350 is also turned on when the heaters 24a and 24b are turned on, the resistance wire 256 of the sensing device 70 is heated up faster than the liquid 22 in the test well 14 and causes the heaters 24a and 24b to be turned off in the above manner before the temperature of the liquid 22 increases above the selected temperature value an appreciable amount. The heaters 24a and 24b are continuously turned on and off in the above manner to tend to maintain the temperature value of the liquid 22 in the test well 14 at the selected low temperature, even though the evaporator 28 is continuously operating to tend to lower the temperature value of the liquid 22 in the test well 14 below the selected temperature value.

Therefore, it can be seen that the apparatus 10 is adapted to maintain the temperature value of the liquid 22 in the test well 14 thereof at any selected temperature, either above or below room temperature, as indicated by the pointer 78 in a novel manner whereby the fluctuation of the temperature of the liquid 22 relative to the selected temperature is negligible, so that accurate tesing and calibration of instruments can be made.

It should also be noted that novel means are provided for driving an agitator motor to continuously circulate the liquid 22 in the test well 14 so as to maintain a uniform temperature thereof.

Also, improved compressor means are provided for permitting the cooling means of this invention to maintain the liquid 22 at a low temperature when desired.

While the form of the invention now preferred has been disclosed as required by the patent statutes, other forms may be used, all coming within the scope of the claims which follow.

What is claimed is:

1. Apparatus for maintaining at a selected temperature a liquid for testing and calibrating instruments comprising in combination, a receptacle having a certain height and having an open top, liquid in said receptacle, a refrigerant conducting conduit in said receptacle adjacent to and overlying the inner surface of the wall of the receptacle, a vertically extending foraminous shield in the receptacle surrounded by said conduit, said shield being open at the top and at the bottom and enclosing an area into which an instrument may be introduced into the liquid for testing, the conduit and shield being spaced from the bottom of the receptacle, said coil being adapted to have a refrigerant circulated therethrough, a rotary impeller supported beneath said shield in the space between the shield and the bottom of the receptacle, said impeller being adapted when rotated in one direction to draw liquid down from said space through the bottom of the shield and impell it upward over said conduit between the shield and receptacle wall, electrical driving means for rotating said impeller, electrical heating means upon the outer side of the receptacle for heating the liquid, an electrical resistance sensing device extending into the receptacle to the approximate center thereof between the lower end of the foraminous shield and said impeller, electric circuitry having means for connection with a source of electric potential and having said heating means, said sensing means and said impeller driving means therein, other electric resistance heating means connected with said circuitry and positioned to heat the resistance sensing means when energized, means actuated by the sensing means for effecting actuation of the first said heating means and said other electrical resistance means when the temperature of the liquid falls below a predetermined temperature while said cooling means is functioning to prevent the temperature of said liquid rising above said predetermined temperature, whereby the temperature of said liquid is prevented from rising above said predetermined temperature an amount equal to said predetermined temperature.

2. The invention according to claim 1, wherein said driving means embodies a motor, a conduit having an end connected with the receptacle below the level of the liquid therein and having its other end disposed above the level of said liquid and spaced from the receptacle, and flexible drive means extending through said conduit and having one end operatively connected to said impeller and having its other end operatively connected to said motor.

3. The invention according to claim 1, wherein the electrical resistance of said sensing means and said other electrical resistance heating means are disposed within a metal container and electrically insulated therefrom and said other heating means includes said metal container.

4. The invention according to claim 1, wherein the first said heating means comprises at least two electrical resistances, and wherein said circuitry includes switch means by which different energized conditions of said resistances may be selected to vary the intensity of the heat provided, in one of which said selected conditions the said resistances may be coupled in series relationship and in another of said selected conditions the said resistances may be coupled in parallel relationship.

5. The invention according to claim 1, wherein said liquid has the property of maintaining its liquid state at temperatures which may range from an extreme low of about $-55°$ C. to a high of about $+120°$ C.

6. The invention according to claim 1, with means in said circuitry for selectively varying said predetermined temperature.

7. The invention according to claim 1, with an outer casing enclosing the receptacle and other elements interconnected therewith and thermal insulation means lining the interior of the casing.

References Cited by the Examiner

UNITED STATES PATENTS

| 1,810,637 | 6/1931 | Beers | 257—108 |
| 1,912,921 | 6/1933 | Spencer | 236—68 |
| 2,024,385 | 12/1935 | Persons | 257—287 |

(Other references on following page)

UNITED STATES PATENTS

| | | | |
|---|---|---|---|
| 2,176,300 | 10/1939 | Fette | 230—182 |
| 2,232,998 | 2/1941 | Cernohouz et al. | 165—26 |
| 2,529,120 | 11/1950 | Wallach et al. | 259—108 |
| 2,645,461 | 7/1953 | Brown et al. | 165—26 |
| 2,765,976 | 10/1956 | Stewart | 230—182 |
| 2,876,327 | 3/1959 | Leisey | 165—39 |
| 2,994,514 | 8/1961 | Brown | 257—287 |
| 3,108,453 | 10/1963 | Tinkey | 62—57 |

ROBERT A. O'LEARY, *Primary Examiner.*

HERBERT L. MARTIN, *Examiner.*

CHARLES SUKALO, JAMES W. WESTHAVER,
*Assistant Examiners.*